(12) United States Patent
Klemic

(10) Patent No.: US 7,410,588 B2
(45) Date of Patent: Aug. 12, 2008

(54) AQUEOUS WASTE PROCESSING METHOD

(76) Inventor: John Klemic, 18888 Lancashire Rd., Detroit, MI (US) 48223

( * ) Notice: Subject to any disclaimer, the term of this patent is extended or adjusted under 35 U.S.C. 154(b) by 0 days.

(21) Appl. No.: 11/858,278

(22) Filed: Sep. 20, 2007

(65) Prior Publication Data

US 2008/0073274 A1    Mar. 27, 2008

Related U.S. Application Data

(60) Provisional application No. 60/826,647, filed on Sep. 22, 2006.

(51) Int. Cl.
*B01D 29/00* (2006.01)
(52) U.S. Cl. .................. 210/670; 210/689; 210/748
(58) Field of Classification Search ............ 210/670, 210/689, 748
See application file for complete search history.

(56) References Cited

U.S. PATENT DOCUMENTS 6,051,317 A * 4/2000 Brueggemann et al. ...... 428/378
6,869,464 B2 * 3/2005 Klemic ........................ 95/117

* cited by examiner

*Primary Examiner*—Chester T Barry
(74) *Attorney, Agent, or Firm*—Gifford, Krass, Sprinkle et al.

(57) ABSTRACT

A process for purifying a liquid from a dissolved solute includes the exposure of the liquid to a material absorbing the liquid in preference to the dissolved solute. The dissolved solute is adsorbed onto the material. Through exposure of the dissolved solute adsorbed on said material to output of an ionization source, solute release from the material occurs. Purification of the liquid to remove the dissolved solute occurs through the release of the liquid from said material separate from the release of the dissolved solute. A system for purifying a liquid from a dissolved solute includes a super absorbent polymer within a housing. A pH source is provided to released purified absorbed liquid portion A via a first outlet in the housing for collecting the released absorbed liquid portion A. An ionization source releases solute absorbed liquid portion B that is collected as a solute rich adsorbed liquid portion B.

11 Claims, 2 Drawing Sheets

AQUEOUS WASTE PROCESSING METHOD

RELATED APPLICATIONS

This application is a non-provisional application that claims priority benefit to U.S. Provisional application 60/826,647 filed on Sep. 22, 2006, the contents of which are incorporated herein.

FIELD OF THE INVENTION

The present invention in general relates to the purification of a liquid from a dissolved solute and in particular to management of a manure lagoon.

BACKGROUND OF THE INVENTION

Aqueous waste treatment is a costly multistage process involving aeration, filtration, precipitation, settling and other steps to provide effluent of sufficient quality to be released back into the environment. The sophisticated water treatment facilities associated with a modern sewage treatment plant or waste water treatment facility remain cost prohibitive and invariably geographically remote from large scale animal husbandry operations such as concentrated animal feeding operations (CAFOs). Such large scale animal husbandry operations produce large volumes of manure that represent a serious environmental problem in terms of odor, methane sources, and fly breeding facilities and represent a source of ground water contamination. Additionally, concern is mounting that such manure lagoons also represent a serious source of hormones and antibiotics that contaminate the environment.

The purification of a liquid from a dissolved solute typically involves solvent stripping, chromatography or reverse osmosis membranes, yet the use of these techniques is limited by throughout and the cost of consumables.

While prior art attempts to dehydrate manure lagoons with the use of super absorbent polymer absorption and subsequent liquid release with a pH stimulus have proved successful in absorbing water and releasing the same subsequently have reduced problems associated with manure lagoons, problems still persist. U.S. Pat. No. 6,869,464 B2 is representative of the use of super absorbent polymers for moisture absorption associated with manure lagoons.

Thus, there exists a need for a system and process well suited for the separation of a liquid from a dissolved solute that is efficient to an extent such that a manure lagoon can be operated to manage health and environmental problems associated with such facilities.

SUMMARY OF THE INVENTION

A process for purifying a liquid from a dissolved solute is provided that includes the exposure of the liquid to a material absorbing the liquid in preference to the dissolved solute. The dissolved solute is adsorbed onto the material, Through exposure of the dissolved solute adsorbed on said material to output of an ionization source, solute release from the material occurs. Purification of the liquid to remove the dissolved solute occurs through the release of the liquid from said material separate from the release of the dissolved solute.

A system for purifying a liquid from a dissolved solute includes a super absorbent polymer within a housing. A pH source is provided to selectively change the pH of said super absorbent polymer to yield a released purified absorbed liquid portion A via a first outlet in the housing for collecting the released absorbed liquid portion A. An ionization source selectively exposed to said super absorbent polymer releases solute absorbed liquid portion B that is removed from the housing via a second outlet in the housing collecting the released solute rich adsorbed liquid portion B.

BRIEF DESCRIPTION OF THE DRAWINGS

The present invention is detailed with reference to the following nonlimiting illustrations associated with the present invention.

DESCRIPTION OF THE PREFERRED EMBODIMENTS

The present invention has utility as a system and process for purifying a liquid from a dissolved solute. The present invention is well suited for the operation of a manure lagoon so as to reduce odor and pollution associated with animal husbandry operations.

While the present invention is detailed with respect to waste management within a concentrated animal feed operation, it is appreciated that the use of a material to collect liquid through both absorption and adsorption along with preferential deabsorption with an ionization source generate a first collection stream and deabsorption from the material to generate a second collection source is also highly applicable to such varied fields as kidney dialysis and self-contained environments associated with spacecraft, submarines and the like.

Figure 1:
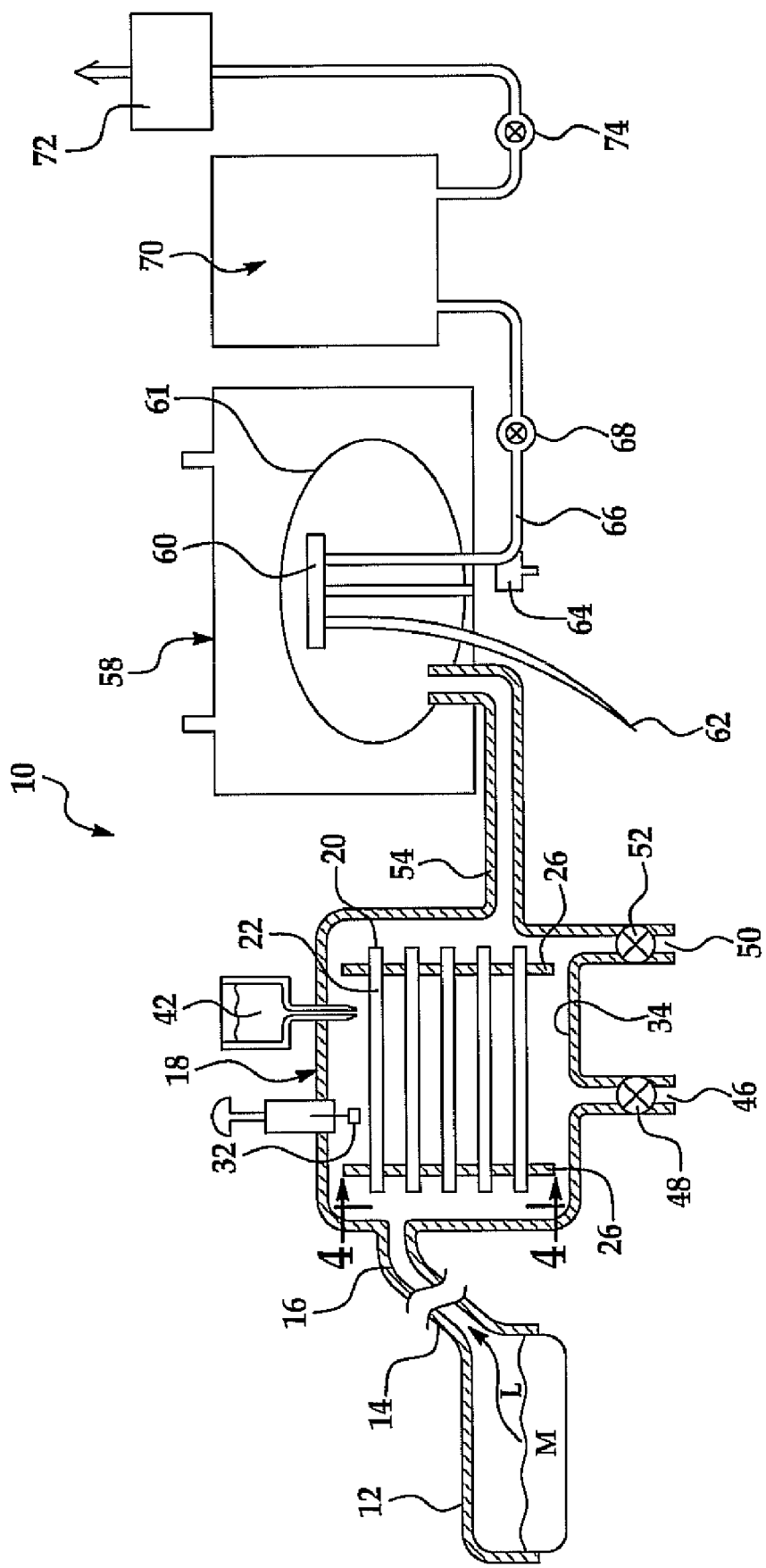
FIG. 1 is a cross-sectional schematic depicting an inventive system for liquid purification with optional components to render the inventive system well suited for manure lagoon operation.

Referring now to FIG. 1, an inventive system for manure lagoon management is depicted in general at 10. The system 10 has a cover 12 including an outlet 14 overlying a manure lagoon denoted at M. Through bacterial action within the manure lagoon M, methane, ammonia and other gases are evolved so as to pressurize the cover 12 and urge the evolved gases through the outlet 14. The outlet 14 is in fluid communication with an inlet 16 of a liquid binding housing 18. The liquid binding housing 18 contains a material 20 capable of retaining a liquid through both processes of absorption and adsorption. In instances when the liquid of interest is water, suitable materials for liquid adherence illustratively include hydrophilic clay in contact with sand or other high surface area ceramic or zeolite and a super absorbent polymer. In instances when a liquid intended to be purified is other than water, the same materials are used and the liquid is able to be both absorbed and adsorbed by the material. In instances of lipophilic liquids, a lipophilic clay is used such as an alkylated montmorillite clay or a polymer is provided that creates considerable hydrogen bonding and swell in the presence of the liquid. A super absorbent polymer has the property of being able to absorb a multiple of the super absorbent polymer mass of a liquid and/or at least the liquid in response to an external stimulus. A water swellable super absorbent polymer as described herein is a synthetic or natural polymer and illustratively includes sodium polyacrylate. Super absorbent polymers and optional matrices therefor are detailed in U.S. Pat. No. 6,051,317 which is incorporated herein by reference. Grain sizes for super absorbent polymer particles range from 0.1 to 20,000 microns. Super absorbent polymers currently find application in diapers, feminine hygiene products, and environmental spill remediation.

The material 20 capable of both absorption and adsorption of the liquid entering the inlet 16 is provided in a form to allow the surface area of the material 20 to come into contact with the liquid entering the inlet 16. In instances where the material 20 is a super absorbent polymer, the material 20 is provided as a granular material in a honeycombed tray 22. The tray 22 affords a retention surface for the material 20, appreciable surface area with which the contaminated liquid L can interact as well as access for the absorption and deabsorption stimuli. The tray 22 is detailed with greater clarity with respect to FIG. 4 following the cross section of line 4-4 of FIG. 1. The tray 22 has a series of tubes 24 having sidewalls that are permeable to the contaminated liquid L as well as to air. The tubes 24 contain the material 20. The tubes 24 are readily formed of metal mesh, polymeric mesh or other like materials capable of allowing liquid and gas communication across the tube while retaining the material 20 therein. End plates 26 and 26' support the tubes 24 and are themselves porous to contaminated liquid L either through material choice or additional holes being formed therethrough.

Figure 3:
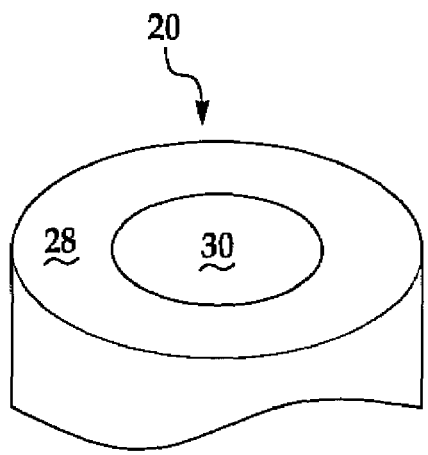
FIG. 3 is a perspective view of an inorganic material operative in the inventive system for both absorption and adsorption of a liquid.
Figure 4:
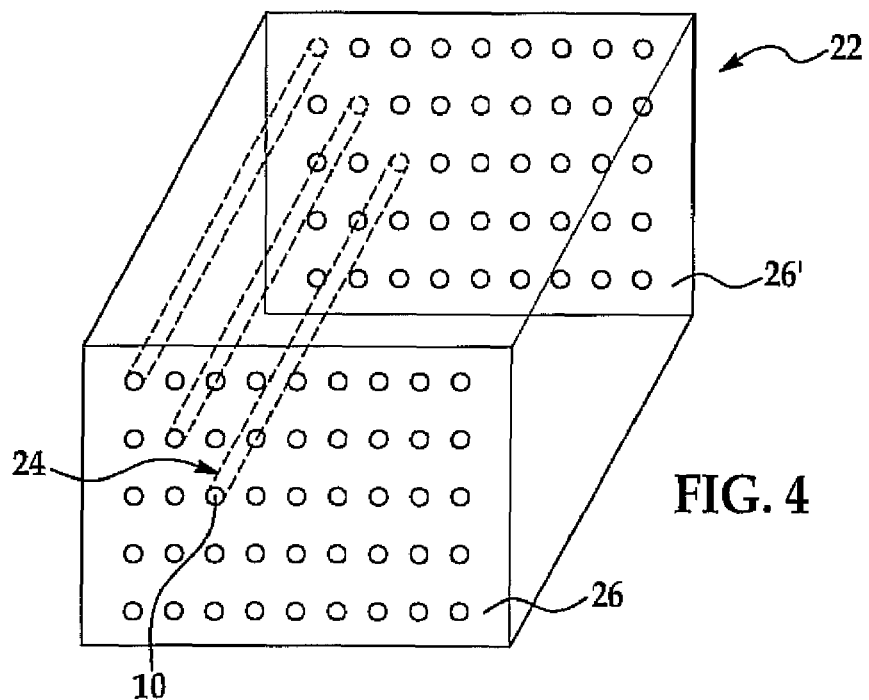
FIG. 4 is a perspective view of the tray holder of an inventive system supportive of liquid absorptive and adsorptive material of FIG. 1.

In the instance where the material 20 is clay in contact with absorptive sand or other substance, the configuration preferably includes an annular ring of sand or other adsorptive material 28 packed around a clay core 30. This substantially inorganic material 20 provides for adsorption through the annular composition 28 of sand, ceramic or other high surface area material with the clay 30 able to absorb moisture by way of osmosis as depicted with greater specificity in FIG. 3. It is appreciated that such an inorganic material 20 as shown in FIG. 3 is readily packed within a housing 18 or alternatively within tubes 24 as shown in FIG. 4.

Figure 2:
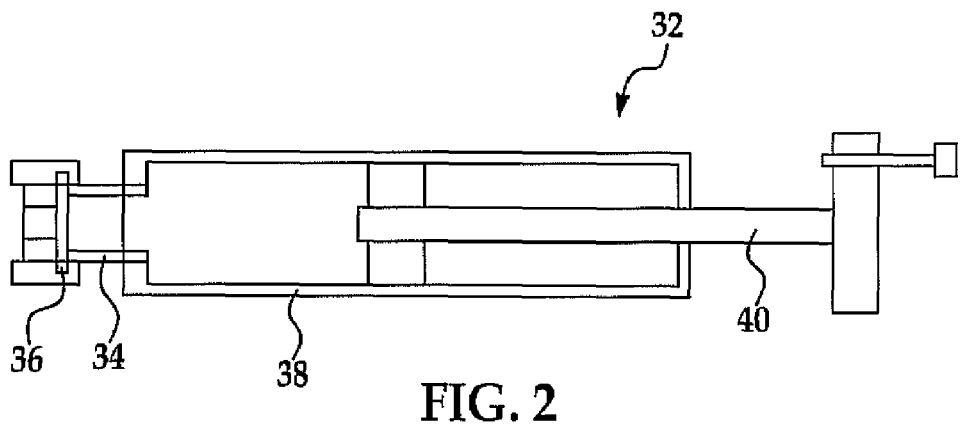
FIG. 2 is a cross-sectional view of an ionization source assembly operative within the inventive system.

The housing 18 includes an ionization source 32 that in a shielded state does not provide ionizing radiation to the volume 34 of the housing 18. The ionization source 32 illustratively includes a radioactive source emitting alpha particles such as a polonium 210, radium, or americanium 241 source. A more detailed view of the ionization source 32 depicted in FIG. 1 is provided in FIG. 2 and includes a source holder 34, a radiation filter 36, and a volume flow adjuster chamber 38 with changes in volume chamber 38 being controlled by a crank activated vacuum plunger 40. A pH stimulus source 42 alters the pH of a super absorbent polymer material 20 to release absorbed liquid therefrom. Preferably the pH stimulus source 42 terminates in a spray nozzle 44 to facilitate deabsorption of liquid from a super absorbent polymer material 20. It is appreciated that a clay material absorbing liquid is also sensitive to pH adjustment or alternatively heating to induce thermal desiccation. The housing 18 has an absorbed liquid drain 46 to remove purified liquid from housing 18 that previously had been absorbed onto the material 20. A valve 48 is provided to selectively close the drain 46. A second adsorbed drain 50 is also provided in the housing 18 with a valve 52. In operation, a quantity of liquid L in liquid form or in a vapor passes through the housing 18 to collect the liquid on material 20 by both adsorption and absorption processes. With the closure of valve 48 and the exposure of the liquid containing material 20, adsorbed liquid is preferentially released from the material 20 and exits the housing 18 by way of drain 50. Absorbed liquid contained within the material 20 is released upon application of a pH inducing stimulus. The deabsorbed liquid is then purified and collected separately from the adsorbed liquid by closing valve 52 and opening valve 48. The nature of the pH stimulus source acid is almost unlimited and includes common mineral and organic acids with environmentally benign acids such as acetic, citric, propionic and ascorbic being particularly economical sources as in the form of vinegar, lemon juice, and the like.

Without intending to be bound to a particular theory, ionic contaminants and solutes within a liquid are preferentially adsorbed whereas the base liquid such as water is preferentially absorbed onto a retentive material 20. Through the induction of release or the introduction of a stimulus selective for deabsorption and a second stimulus, such as pH or heat, for selective deabsorption of the liquid, a net purification of the liquid occurs without resort to distillation or complex purification filtration systems to yield a liquid rich portion A. In the instance where the liquid source is urine, purified water is collected as the deabsorbed liquid fraction whereas urine solutes such as urea and other electrolytes are preferentially adsorbed on a material and upon deabsorption are readily collected as a salt rich liquid portion B amenable to further purification and/or accumulation.

It is appreciated that the system detailed with respect to FIG. 1 is well suited for purification of a liquid from a dissolved contaminant such as purification of water from urine. Optionally, an additional system is provided for the collection of gases associated with the manure lagoon M. A gas outlet 54 communicates dehydrated gases including methane and ammonia to a lung chamber 56 The lung chamber 56 has a lung balloon 61 containing a side spreader 60, an ammonia gas collector, and a drain basin 64 for collecting liquid condensate precipitating material and the lice from the chamber 58. A methane outlet pipe 66 is provided. Preferably, the outlet 66 is in fluid communication with a compressor pump 68 to draw methane from the chamber 58. The methane outlet 66 is then amenable to combustion. Optionally, the outlet 66 enters a manifold balloon 70 from which the methane is periodically drawn to feed a tank filling station 72 with the use of a pressurizing compressor 74.

The foregoing description is illustrative of particular embodiments of the invention, but is not meant to be a limitation upon the practice thereof. The following claims, including all equivalents thereof, are intended to define the scope of the invention.

The invention claimed is:

1. A process for purifying a liquid from a dissolved solute comprising:
    exposing the liquid to a material absorbing the liquid in preference to the dissolved solute, the dissolved solute being adsorbed onto the material;
    exposing the dissolved solute adsorbed on said material to output of an ionization source to release the dissolved solute from said material; and
    releasing the liquid from said material separate from the release of the dissolved solute to purify the liquid.

2. The process of claim 1 wherein said material is a super absorbent polymer.

3. The process of claim 2 wherein said super absorbent polymer is a cationic polyacrylate.

4. The process of claim 1 wherein said material is clay in proximity to granular particulate.

5. The process of claim 1 wherein said ionization source is an alpha radiation source.

6. The process of claim 4 wherein said alpha radiation source is polonium 210.

7. The process of claim 1 wherein the liquid is deabsorbed from said material by pH change.

8. Tie process of claim 1 wherein the liquid is water.

9. The process of claim 7 wherein the dissolved solute is urea.

10. The process of claim 1 wherein the liquid is water and the dissolved solute are urine solutes and further comprising analyzing the dissolved solute released from said material for a chemical compound.

11. The process of claim 10 wherein the chemical compound is selected from the group consisting of: a hormone, an antibiotic, and a bacterial metabolite.

* * * * *

UNITED STATES PATENT AND TRADEMARK OFFICE
CERTIFICATE OF CORRECTION

PATENT NO.       : 7,410,588 B2
APPLICATION NO.  : 11/858278
DATED            : August 12, 2008
INVENTOR(S)      : John Klemic It is certified that error appears in the above-identified patent and that said Letters Patent is hereby corrected as shown below:

Column 4, line 9, replace "deabsorption" with --deadsorption--

Column 4, line 21, replace "lice" with --like--

Column 4, line 56, replace "tie" with --the--

Signed and Sealed this

Twenty-eighth Day of October, 2008

JON W. DUDAS
*Director of the United States Patent and Trademark Office*